United States Patent
Wang et al.

(10) Patent No.: US 12,164,172 B2
(45) Date of Patent: Dec. 10, 2024

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Chih-Wei Weng, Taoyuan (TW); Che-Wei Chang, Taoyuan (TW); Ko-Lun Chao, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 538 days.

(21) Appl. No.: 17/502,878

(22) Filed: Oct. 15, 2021

(65) Prior Publication Data
US 2022/0121025 A1    Apr. 21, 2022

Related U.S. Application Data

(60) Provisional application No. 63/108,051, filed on Oct. 30, 2020, provisional application No. 63/092,342, filed on Oct. 15, 2020.

(51) Int. Cl.
| | |
|---|---|
| *G02B 26/02* | (2006.01) |
| *G02B 1/04* | (2006.01) |
| *G02B 7/00* | (2021.01) |
| *G02B 7/04* | (2021.01) |
| *G02B 26/04* | (2006.01) |
| *G03B 9/02* | (2021.01) |
| *G03B 9/08* | (2021.01) |
| *G03B 9/36* | (2021.01) |
| *G03B 11/00* | (2021.01) |

(52) U.S. Cl.
CPC ............... *G02B 7/04* (2013.01); *G02B 1/041* (2013.01); *G02B 7/00* (2013.01); *G02B 7/003* (2013.01); *G02B 7/006* (2013.01); *G02B 26/04* (2013.01); *G03B 9/02* (2013.01); *G03B 9/08* (2013.01); *G03B 9/36* (2013.01); *G03B 11/00* (2013.01)

(58) Field of Classification Search
CPC . G02B 7/04; G02B 1/041; G02B 7/00; G02B 7/003; G02B 7/006; G02B 26/04; G03B 9/02; G03B 9/08; G03B 9/36; G03B 11/00; G03B 11/043
See application file for complete search history.

(56) References Cited

U.S. PATENT DOCUMENTS

2020/0249415 A1 *   8/2020   Wang ..................... G02B 26/02

\* cited by examiner

*Primary Examiner* — Euncha P Cherry
(74) *Attorney, Agent, or Firm* — MUNCY, GEISSLER, OLDS & LOWE, P.C.

(57) ABSTRACT

The present disclosure provides an optical element driving mechanism, which includes a first movable part, a fixed assembly, a first driving assembly, a second movable part, a second driving assembly and a locking assembly. The first movable part is configured to connect an optical element. The first movable part is movable relative to the fixed assembly. The first driving assembly is configured to drive the first movable part to move relative to the fixed assembly, and the second driving assembly is configured to drive the second movable part to move relative to the first movable part and the fixed assembly. The locking assembly is configured to fix the first movable part at a first position relative to the fixed assembly.

20 Claims, 14 Drawing Sheets

OPTICAL ELEMENT DRIVING MECHANISM

CROSS REFERENCE TO RELATED APPLICATIONS

This application claims the benefit of U.S. Provisional Application No. 63/092,342, filed on Oct. 15, 2020, U.S. Provisional Application No. 63/108,051, filed on Oct. 30, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism with a shutter structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a first movable part, a fixed assembly, a first driving assembly, a second movable part, a second driving assembly and a locking assembly. The first movable part is configured to connect an optical element. The first movable part is movable relative to the fixed assembly. The first driving assembly is configured to drive the first movable part to move relative to the fixed assembly, and the second driving assembly is configured to drive the second movable part to move relative to the first movable part and the fixed assembly. The locking assembly is configured to fix the first movable part at a first position relative to the fixed assembly.

According to some embodiments, the optical element driving mechanism further includes a first opening configured to allow an external light traveling along a first axis to pass through; when viewed along the first axis, the first driving assembly is located between the second driving assembly and the first opening; when viewed along the first axis, the optical element driving mechanism has a long strip-shaped structure extending along a second axis, and the first opening, the first driving assembly and the second driving assembly are arranged along the second axis; the first axis is not parallel to the second axis; the second axis is perpendicular to the first axis; when viewed along the first axis, and when the first movable part is located at the first position, the optical element does not overlap at least a part of the first opening; when viewed along the first axis, and when the first movable part is located at a second position, the optical element overlaps at least a part of the first opening; when viewed along the second axis, the first driving assembly overlaps at least a part of the second driving assembly.

According to some embodiments, the first driving assembly includes: a first coil; a first magnetic element, corresponding to the first coil; and a first magnetically conductive element, having a magnetically conductive material and having a long strip-shaped structure; wherein a first winding axis of the first coil is parallel to an extending direction of the first magnetically conductive element; the first driving assembly is configured to drive the first movable part to move along the second axis relative to the fixed assembly.

According to some embodiments, the second driving assembly includes: a second coil; a second magnetic element, corresponding to the second coil; and a second magnetically conductive element, having a magnetically conductive material and having a long strip-structure; shaped structure; a second winding axis of the second coil is not parallel to an extending direction of the second magnetically conductive element.

According to some embodiments, in the second axis, a maximum size of the second magnetically conductive element is smaller than a maximum size of the second magnetic element; in the second axis, the maximum size of the second magnetically conductive element is smaller than a maximum size of the second coil; the first winding axis is not parallel to the second winding axis; an arrangement direction of the first coil and the first magnetic element is parallel to an arrangement direction of the second coil and the second magnetic element; the extending direction of the first magnetically conductive element is not parallel to the extending direction of the second magnetically conductive element.

According to some embodiments, the optical element driving mechanism further includes a guiding assembly configured to guide the second movable part to move along a third axis, and the guiding assembly includes: a first guiding element having a long strip-shaped structure and extending along the third axis; a second guiding element, having a long strip-shaped structure and extending along the third axis; a first guiding structure, fixedly disposed on the second movable part and configured to correspond to the first guiding element; and a second guiding structure, fixedly disposed on the second movable part and configured to correspond to the second guiding element.

According to some embodiments, when viewed along the second axis, the second magnetic element overlaps at least a part of the first guiding element; when viewed along the second axis, the second magnetic element overlaps at least a part of the second guiding element; when viewed along the second axis, the second coil does not overlap the first guiding element; when viewed along the second axis, the second coil does not overlap the second guiding element.

According to some embodiments, the first guiding structure has a closed perforated structure; when viewed along the third axis, the second guiding structure has a recessed structure, and the recessed structure extends along the second axis; the guiding assembly further includes a first elastic element configured to apply a first pre-pressure to the second movable part; a direction of the first pre-pressure is parallel to the third axis; the first elastic element is disposed on the first guiding element.

According to some embodiments, the optical element driving mechanism further includes a second elastic element disposed between the first movable part and the fixed assembly; the second elastic element includes: a first portion, having a long strip-shaped structure; a second portion, having a long strip-shaped structure, wherein the second portion is parallel to and separated from the first portion; a first connecting portion, wherein the first portion is connected to the second portion via the first connecting portion;

a second connecting portion, wherein the first portion is connected to the second portion via the second connecting portion; and a contact portion, protruded from the second portion.

According to some embodiments, the first portion, the second portion, the first connecting portion and the second connecting portion form a ring-shaped closed structure; in the second axis, a maximum size of the first portion is smaller than a maximum size of the second portion; the second elastic element is configured to limit a motion range of the first movable part relative to the second movable part.

According to some embodiments, the second elastic element and the first elastic element have different materials; the second elastic element has a non-metallic material; the first elastic element has a metal material; a shortest distance between the first portion and the first movable part is less than a shortest distance between the second portion and the first movable part; when the first movable part is located at a first extreme position relative to the fixed assembly, the first portion is in direct contact with the second portion.

According to some embodiments, the locking assembly includes: a first locking element, having a first hook structure; and a second locking element, having a second hook structure corresponding to the first hook structure; wherein the second locking element further includes a third hook structure, corresponding to a fourth hook structure of the first locking element; when the first movable part is located at the first position, a shortest distance between the first locking element and the second hook structure is less than a shortest distance between the first locking element and the third hook structure; when the first movable part is located at the second position, the shortest distance between the first locking element and the second hook structure is greater than the shortest distance between the first locking element and the third hook structure.

According to some embodiments, the first hook structure includes a first surface having a planar structure, which is parallel to the first axis; the first surface is not parallel to the second axis; the first surface is not parallel to the third axis; the second hook structure includes a second surface having a planar structure, which is parallel to the first axis; the second surface is not parallel to the second axis; the second surface is not parallel to the third axis; the third hook structure includes a third surface having a planar structure, which is parallel to the first axis; the third surface is not parallel to the second axis; the third surface is not parallel to the third axis; the fourth hook structure includes a fourth surface having a planar structure, which is parallel to the first axis; the fourth surface is not parallel to the second axis; the fourth surface is not parallel to the third axis; the first locking element is fixedly disposed on the first movable part; the first locking element and the optical element are integrally formed in one piece; the second locking element is fixedly disposed on the second movable part; the second locking element and a second body of the second movable part are integrally formed in one piece; the second locking element is protruded from the second body along the first axis.

According to some embodiments, the second movable part is movable relative to the fixed assembly in a second motion range; the fixed assembly includes an outer frame and a base; the base is configured to accommodate the second driving assembly; the outer frame has a plate-shaped structure and is perpendicular to the first axis; the outer frame has a receiving opening configured to accommodate a part of the second locking element; the outer frame has a first outer frame surface facing the optical element; the outer frame has a second outer frame surface, wherein the first outer frame surface and the second outer frame surface face opposite directions; when the second movable part is located at any position of the second motion range, and when viewed along the second axis or the third axis, the second locking element overlaps at least a part of the first outer frame surface; when the second movable part is located at any position of the second motion range, and when viewed along the second axis or the third axis, the second locking element does not overlap the second outer frame surface.

According to some embodiments, when the first movable part does not contact the second elastic element, the first locking element is not able to be separated from the second locking element.

According to some embodiments, the outer frame further includes: a first side wall, extending along the first axis; a second side wall, extending along the first axis; and a third side wall, extending along the first axis; wherein the first side wall having a plate-shaped structure is parallel to the second side wall having a plate-shaped structure; the second side wall having the plate structure is parallel to the third side wall having a plate structure.

According to some embodiments, the optical element driving mechanism and an optical module are disposed on a base plate; the optical module includes a lens; the optical module is electrically connected to the base plate; the optical element driving mechanism is electrically connected to the base plate; the first side wall is in direct contact with the base plate; the second side wall is in direct contact with the base plate; the third side wall is in direct contact with the base plate; when viewed along the first axis, the first side wall and the first driving assembly are located on two sides of the first opening.

According to some embodiments, the outer frame further includes: a first side wall, extending along the first axis; a second side wall, extending along the first axis; and a third side wall, extending along the first axis; wherein when the outer frame is combined with the base, the first side wall having a plate-shaped structure is not parallel to the second side wall having a plate-shaped structure; when the outer frame is combined with the base, the second side wall having the plate-shaped structure is not parallel to the third side wall having the plate-shaped structure.

According to some embodiments, the optical element driving mechanism and an optical module are disposed on a base plate; the optical module includes a lens; the optical module is electrically connected to the base plate; the optical element driving mechanism is electrically connected to the base plate; there is a gap between the first side wall and the base plate; there is a gap between the second side wall and the base plate; there is a gap between the third side wall and the base plate.

According to some embodiments, a shortest distance between the first side wall and the base plate is less than a shortest distance between the second side wall and the base plate; the shortest distance between the second side wall and the base plate is equal to a shortest distance between the third side wall and the base plate; the shortest distance between the first side wall and the base plate is less than a shortest distance between the outer frame and the optical module; when viewed along the first axis, the first side wall and the first driving assembly are located on two sides of the first opening.

The present disclosure provides an optical element driving mechanism, including a first movable part, a fixed assembly, a first driving assembly, a second movable part, a second driving assembly and a locking assembly. The first movable part is movable relative to the fixed assembly. The first driving assembly is configured to drive the first movable part to move relative to the fixed assembly. The second driving assembly is configured to drive the second movable part to move relative to the first movable part and the fixed assembly. The locking assembly is configured to fix the first movable part at the first position or the second position relative to the fixed assembly.

The locking assembly includes a first locking element and a second locking element, which are configured to engage with each other, thereby locking the optical element. In some embodiments, the first hook structure of the first locking element is configured to engage with the second hook structure of the second locking element, and the fourth hook structure of the first locking element is configured to engage with the third hook structure of the second locking element. Based on the design of these hook structures, the optical element can be firmly locked. When the optical element driving mechanism is impacted, it can effectively prevent the second locking element from separating from the first locking element on the optical element.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
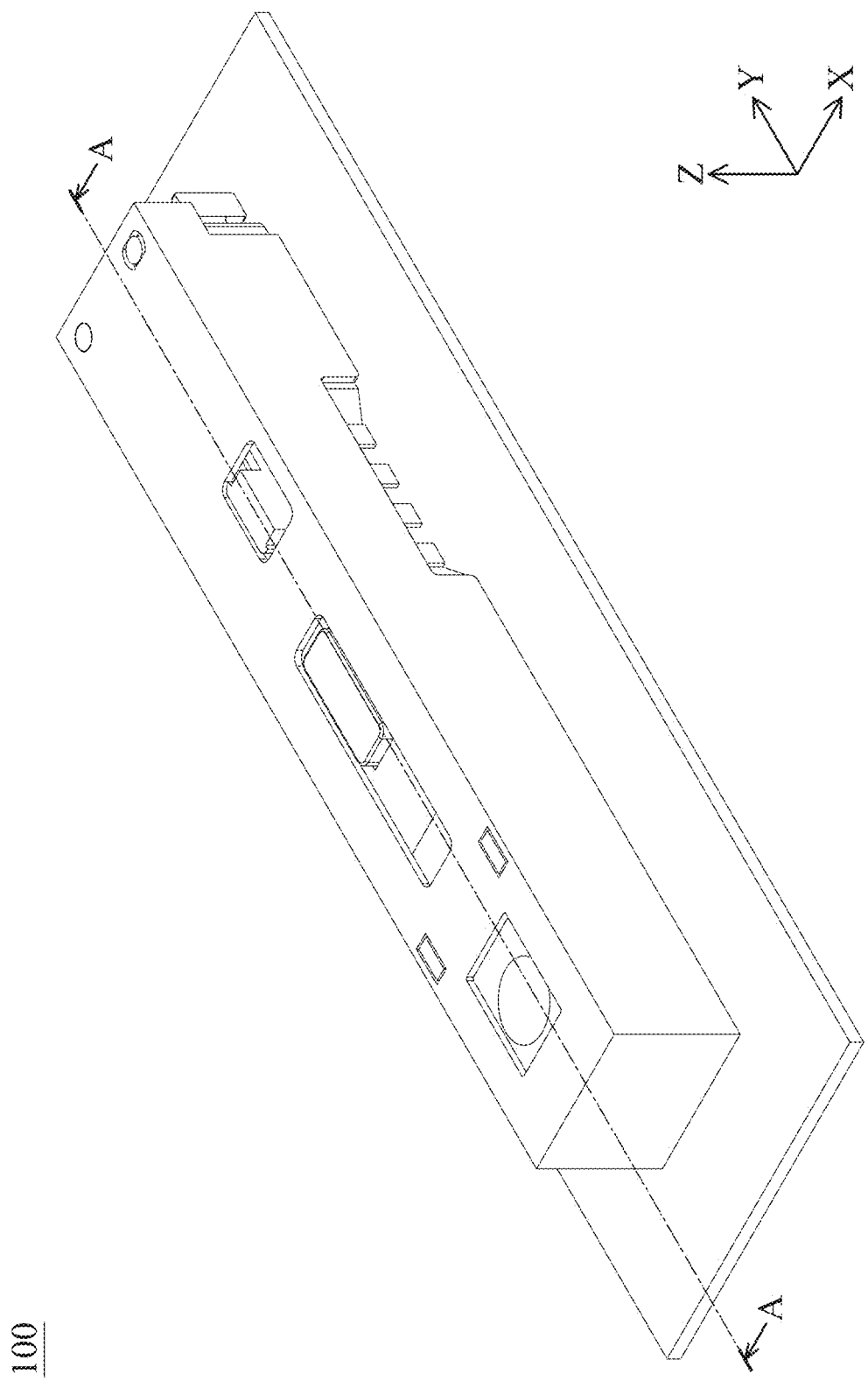
FIG. 1 shows a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
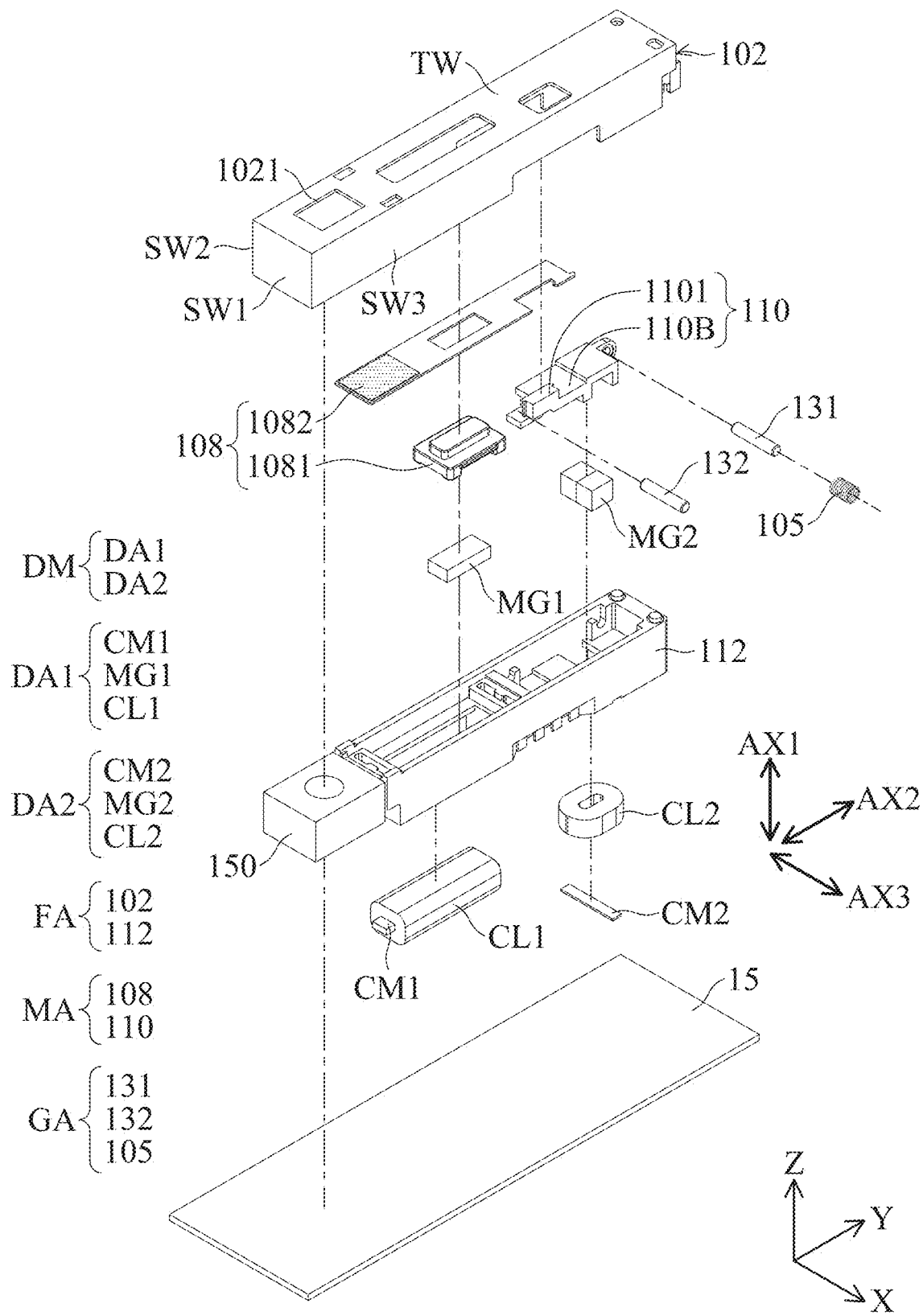
FIG. 2 shows an exploded diagram of the optical element driving mechanism 100 according to the embodiment of the present disclosure.
Figure 3:
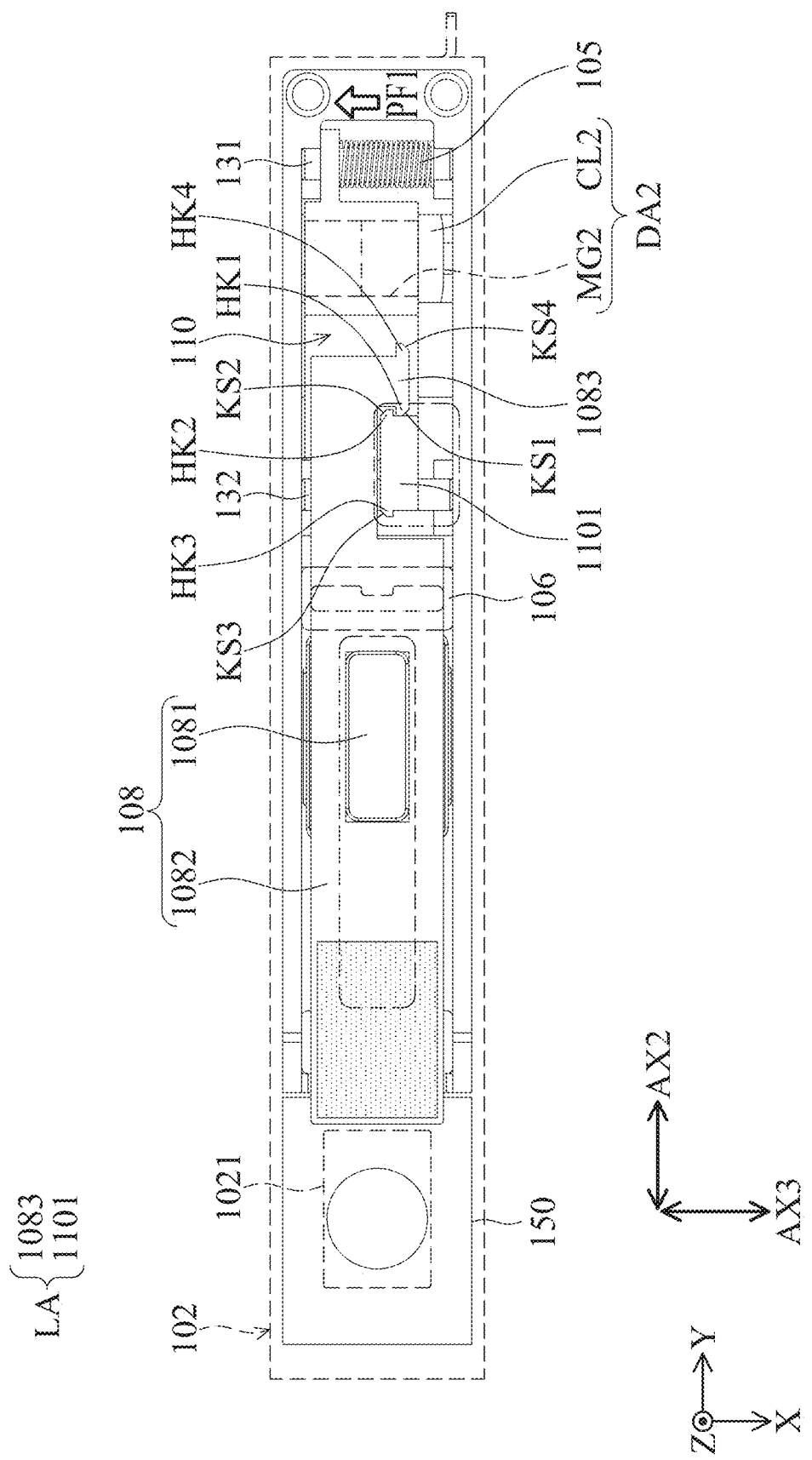
FIG. 3 shows a top view of a partial structure of the optical element driving mechanism 100 according to the embodiment of the present disclosure.

Please refer to FIG. 1 to FIG. 3. FIG. 1 shows a schematic diagram of an optical element driving mechanism 100 according to an embodiment of the present disclosure, FIG. 2 shows an exploded diagram of the optical element driving mechanism 100 according to the embodiment of the present disclosure, and FIG. 3 shows a top view of a partial structure of the optical element driving mechanism 100 according to the embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving module DM. The movable assembly MA is movably connected to the fixed assembly FA. The driving module DM is configured to drive the movable assembly MA to move relative to the fixed assembly FA.

In this embodiment, as shown in FIG. 2, the fixed assembly FA includes an outer frame 102, and a base 112. The movable assembly MA may include a first movable part 108, and a second movable part 110. The first movable part 108 may include a holder 1081 and an optical element 1082. In this embodiment, the optical element 1082 can be used as a light-shielding film or a shutter, but it is not limited thereto. In other embodiments, the optical element 1082 can also be used as a filter or aperture, and so on.

In this embodiment, the holder 1081 is detachably connected to the optical element 1082, but it is not limited thereto. For example, in other embodiments, the optical element 1082 can be connected to the holder 1081 by insert molding technology. For example, the holder 1081 may be made of a non-metal material, such as a plastic material, and the optical element 1082 may be a metal material.

The outer frame 102 is fixedly disposed on the base 112, the outer frame 102 can be combined with the base 112 to cooperatively accommodate the movable assembly MA and the driving module DM, and the first movable part 108 is movable relative to the fixed assembly FA As shown in FIG. 2, the aforementioned outer frame 102 has a first opening 1021, and the base 112 accommodate an optical module 150 (for example, a photosensitive module). The first opening 1021 is configured to allow an external light traveling along a first axis AX1 to pass and to be received by the aforementioned optical module 150 so as to generate a digital image signal.

In this embodiment, the outer frame 102 includes a top wall TW, a first side wall SW1, a second side wall SW2 and a third side wall SW3. The first side wall SW1, the second side wall SW2, and the third side wall SW3 are extended from the top wall TW along the first axis AX1.

The first side wall SW1 having a plate-shaped structure is parallel to the second side wall SW2 having a plate-shaped structure. The second side wall SW2 having a plate structure is parallel to the third side wall SW3 having a plate structure.

As shown in FIG. 2, the optical element driving mechanism 100 and the optical module 150 are disposed on a base plate 15. The base plate 15 is, for example, a main circuit board in an electronic device, but it is not limited thereto. For example, the optical module 150 may have a camera lens, and the optical module 150 is electrically connected to the base plate 15. Similarly, the optical element driving mechanism 100 is also electrically connected to the base plate 15.

It should be noted that, in this embodiment, the first side wall SW1 is in direct contact with the base plate 15, the second side wall SW2 is in direct contact with the base plate 15, and the third side wall SW3 is in direct contact with the base plate 15. Therefore, when the optical element driving mechanism 100 receives a force along the first axis AX1, this force can be dispersed to the base plate 15 through the first side wall SW1, the second side wall SW2 and the third side wall SW3, so that it can avoid the optical element driving mechanism 100 from being crushed.

Figure 4:
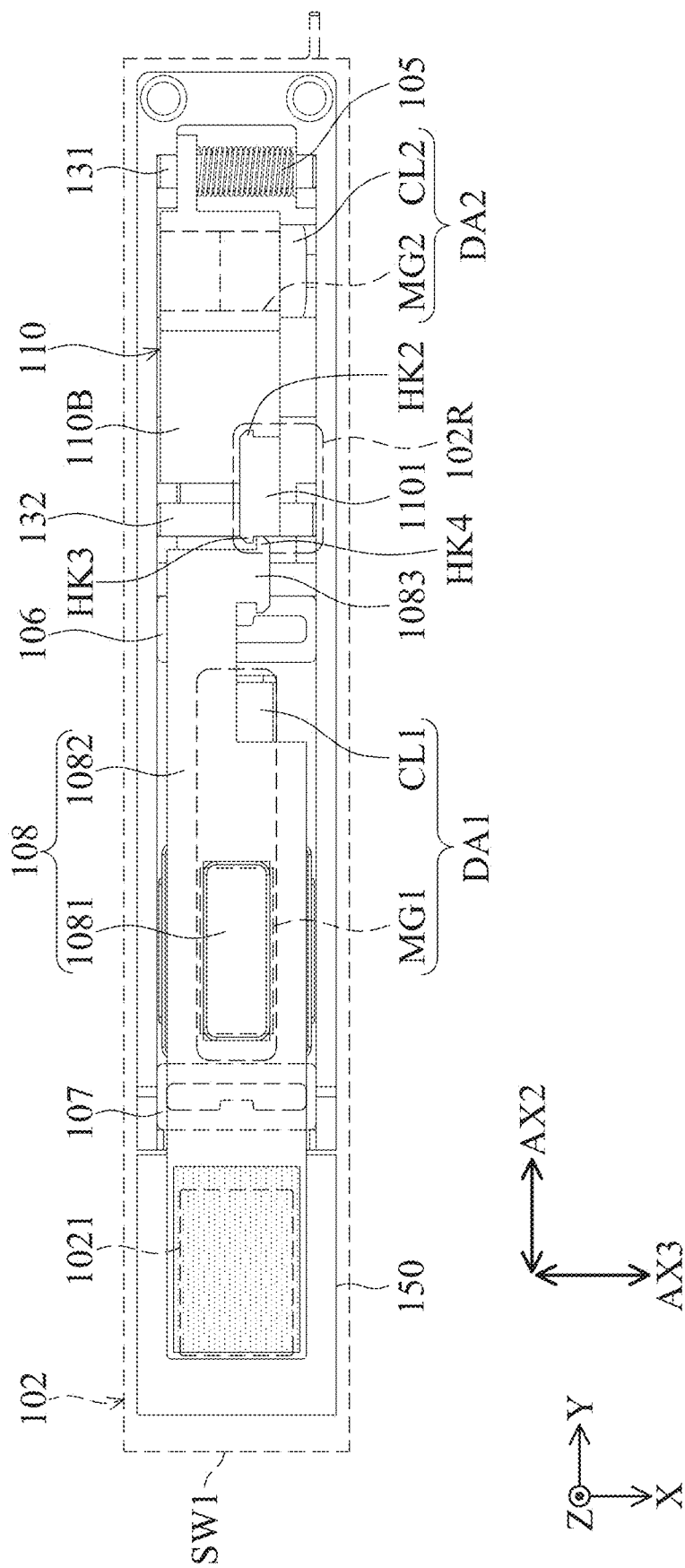
FIG. 4 is a top view of the first opening 1021 being shaded according to an embodiment of the present disclosure.

Please refer to FIG. 1 to FIG. 4 together, and FIG. 4 is a top view of the first opening 1021 being shaded according to an embodiment of the present disclosure. In this embodiment, the optical element driving mechanism 100 may further include a locking assembly LA. The locking assembly LA is configured to fix the first movable part 108 at a first position (the position in FIG. 3) or a second position (the location in FIG. 4) relative to the fixed assembly FA. The locking assembly LA can include a first locking element 1083 and a second locking element 1101, and the first locking element 1083 can be engaged with the second locking element 1101, so that the first movable part 108 is fixed to the first position or the second position relative to the fixed assembly FA.

In this embodiment, the driving module DM may include a first driving assembly DA1 configured to drive the first movable part 108 to move relative to the fixed assembly FA along a second axis AX2, so that the optical element 1082 can selectively overlaps the first opening 1021. The driving module DM may further include a second driving assembly DA2, and the second driving assembly DA2 is configured to drive the second movable part 110 to move relative to the fixed assembly FA.

As shown in FIG. 4, when viewed along the first axis AX1 (the Z-axis), the first driving assembly DA1 is located between the second driving assembly DA2 and the first opening 1021. When viewed along the first axis AX1, the first side wall SW1 and the first driving assembly DA1 are located on two sides of the first opening 1021.

When viewed along the first axis AX1, the optical element driving mechanism 100 includes a long strip-shaped structure extending along the second axis AX2, and the first opening 1021, the first driving assembly DA1 and the second driving assembly DA2 are arranged along the second axis AX2.

The first axis AX1 is not parallel to the second axis AX2. Specifically, the second axis AX2 is perpendicular to the first axis AX1. When viewed along the first axis AX1, and when the first movable part 108 is located at the first position in FIG. 3, the optical element 1082 does not overlap at least a part of the first opening 1021. When viewed along the first axis AX1, and when the first movable part 108 is located at the second position, the optical element 1082 overlaps at least a part of the first opening 1021.

Figure 5:
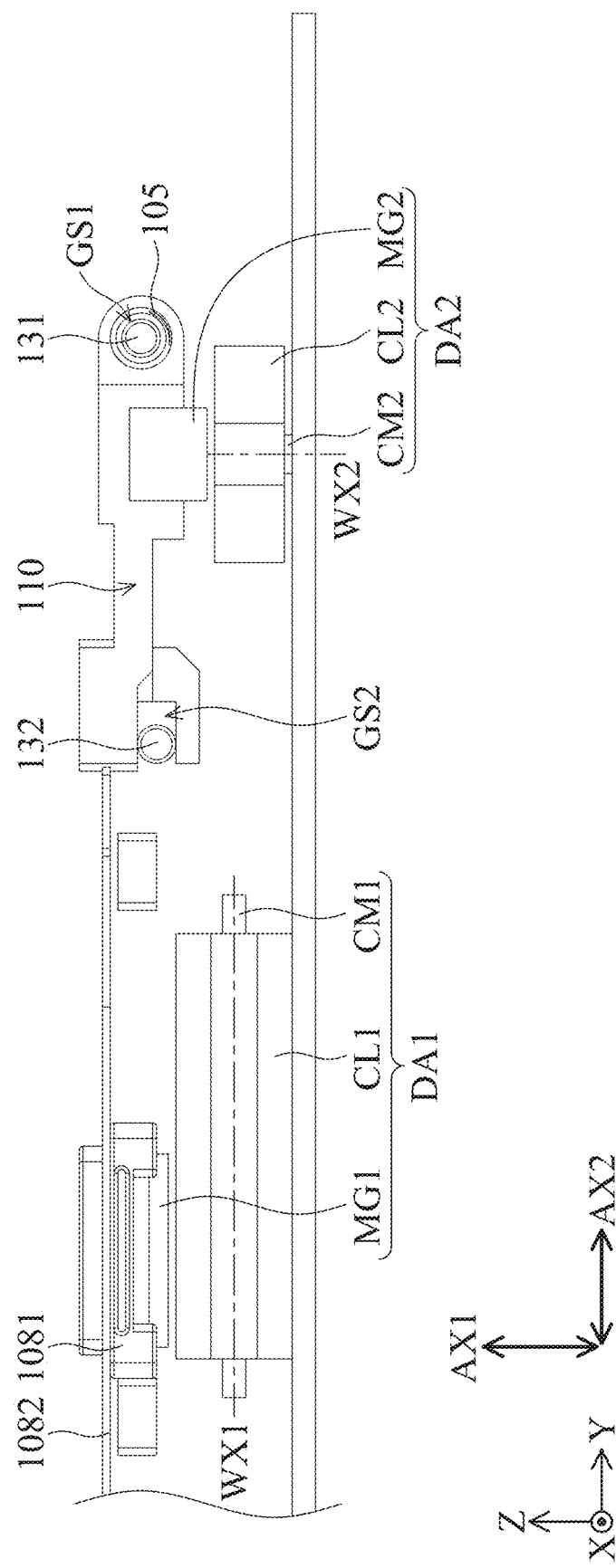
FIG. 5 is a side view of a partial structure of the optical element driving mechanism 100 according to an embodiment of the present disclosure.
Figure 6:
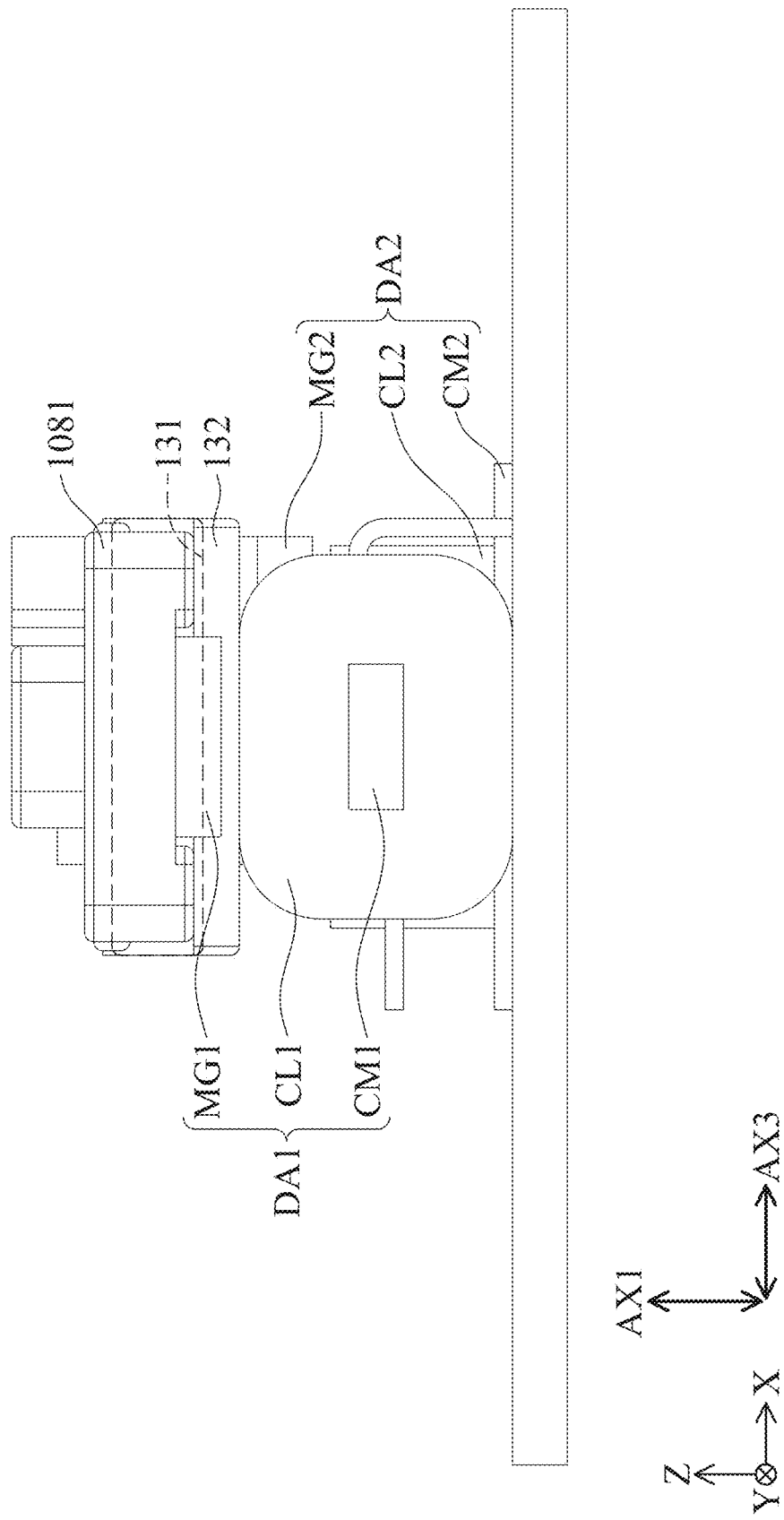
FIG. 6 is a front view of a partial structure of the optical element driving mechanism 100 according to an embodiment of the present disclosure.

Please refer to FIG. 2 to FIG. 6. FIG. 5 is a side view of a partial structure of the optical element driving mechanism 100 according to an embodiment of the present disclosure, and FIG. 6 is a front view of a partial structure of the optical element driving mechanism 100 according to an embodiment of the present disclosure. When viewed along the second axis AX2 (the Y-axis), the first driving assembly DA1 overlaps at least a part of the second driving assembly DA2.

The first driving assembly DA1 includes a first coil CL1, a first magnetically conductive element CM1 and a first magnetic element MG1. The first magnetic element MG1 corresponds to the first coil CL1, and the first magnetically conductive element CM1 corresponds to the first coil CL1. For example, the first coil CL1 surrounds the first magnetically conductive element CM1. The first magnetically conductive element CM1 has a magnetically conductive material and has a long strip-shaped structure, and a first winding axis WX1 of the first coil CL1 is parallel to the extending direction of the first magnetically conductive element CM1.

The second driving assembly DA2 includes a second coil CL2, a second magnetic element MG2 and a second magnetically conductive element CM2. The second magnetic element MG2 corresponds to the second coil CL2, and the second magnetically conductive element CM2 corresponds to the second coil CL2. For example, the second coil CL2 surrounds the second magnetically conductive element CM2. The second magnetically conductive element CM2 has a magnetically conductive material and has a long strip-shaped structure.

A second winding axis WX2 of the second coil CL2, is not parallel to the extending direction of the second magnetically conductive element CM2. For example, the second winding axis WX2 is perpendicular to the extending direction of the second magnetically conductive element CM2.

As shown in FIG. 5, in the second axis AX2, the maximum size of the second magnetically conductive element CM2 is smaller than the maximum size of the second magnetic element MG2. In the second axis AX2, the maximum size of the second magnetically conductive element CM2 is smaller than the maximum size of the second coil CL2.

The first winding axis WX1 is not parallel to the second winding axis WX2. For example, the first winding axis WX1 may be perpendicular to the second winding axis WX2. The arrangement direction of the first coil CL1 and the first magnetic element MG1 is parallel to the arrangement direction (the Z-axis) of the second coil CL2 and the second magnetic element MG2. The extending direction (the Y-axis) of the first magnetically conductive element CM1 is not parallel to the extending direction (the X-axis) of the second magnetically conductive element CM2.

In addition, in this embodiment, the optical element driving mechanism 100 may further include a guiding assembly GA configured to guide the second movable part 110 to move along a third axis AX3. The guiding assembly GA may include a first guiding element 131, a second guiding element 132, a first guiding structure GS1 and a second guiding structure GS2.

The first guiding element 131 has a long strip-shaped structure extending along the third axis AX3, and the second guiding element 132 has a long strip-shaped structure extending along the third axis AX3. The first guiding structure GS1 is fixedly disposed on the second movable part 110 and configured to correspond to the first guiding element 131. The second guiding structure GS2 is fixedly disposed on the second movable part 110 and configured to correspond to the second guiding element 132.

When viewed along the second axis AX2 (the Y-axis), the second magnetic element MG2 overlaps at least a part of the first guiding element 131. When viewed along the second axis AX2, the second magnetic element MG2 overlaps at least a part of the second guiding element 132.

When viewed along the second axis AX2, the second coil CL2 and the first guiding element 131 do not overlap. When viewed along the second axis AX2, the second coil CL2 and the second guiding element 132 do not overlap.

As shown in FIG. 5, the first guiding structure GS1 may be a closed perforated structure to sheathe the first guiding element 131. Furthermore, when viewed along the third axis AX3 (the X-axis), the second guiding structure GS2 has a recessed structure (formed on the second movable part 110), and the recessed structure extends along the second axis AX2. As shown in FIG. 5, the recessed structure may be U-shaped structure. In addition, in this embodiment, the second guiding structure GS2 can also restrict the second movable part 110 from rotating around the third axis AX3 (the X-axis) relative to the base 112 of the fixed assembly FA.

In addition, as shown in FIG. 3, the guiding assembly GA further includes a first elastic element 105 configured to apply a first pre-pressure PF1 to the second movable part 110. The pressing element 105 can be, for example, a spring, and the first pre-pressure PF1 can be an elastic force, but it is not limited thereto.

The direction of the first pre-pressure PF1 is parallel to the third axis AX3, and the first elastic element 105 is disposed on the first guiding element 131. Specifically, the first elastic element 105 sheathes the first guiding element 131.

Figure 7:
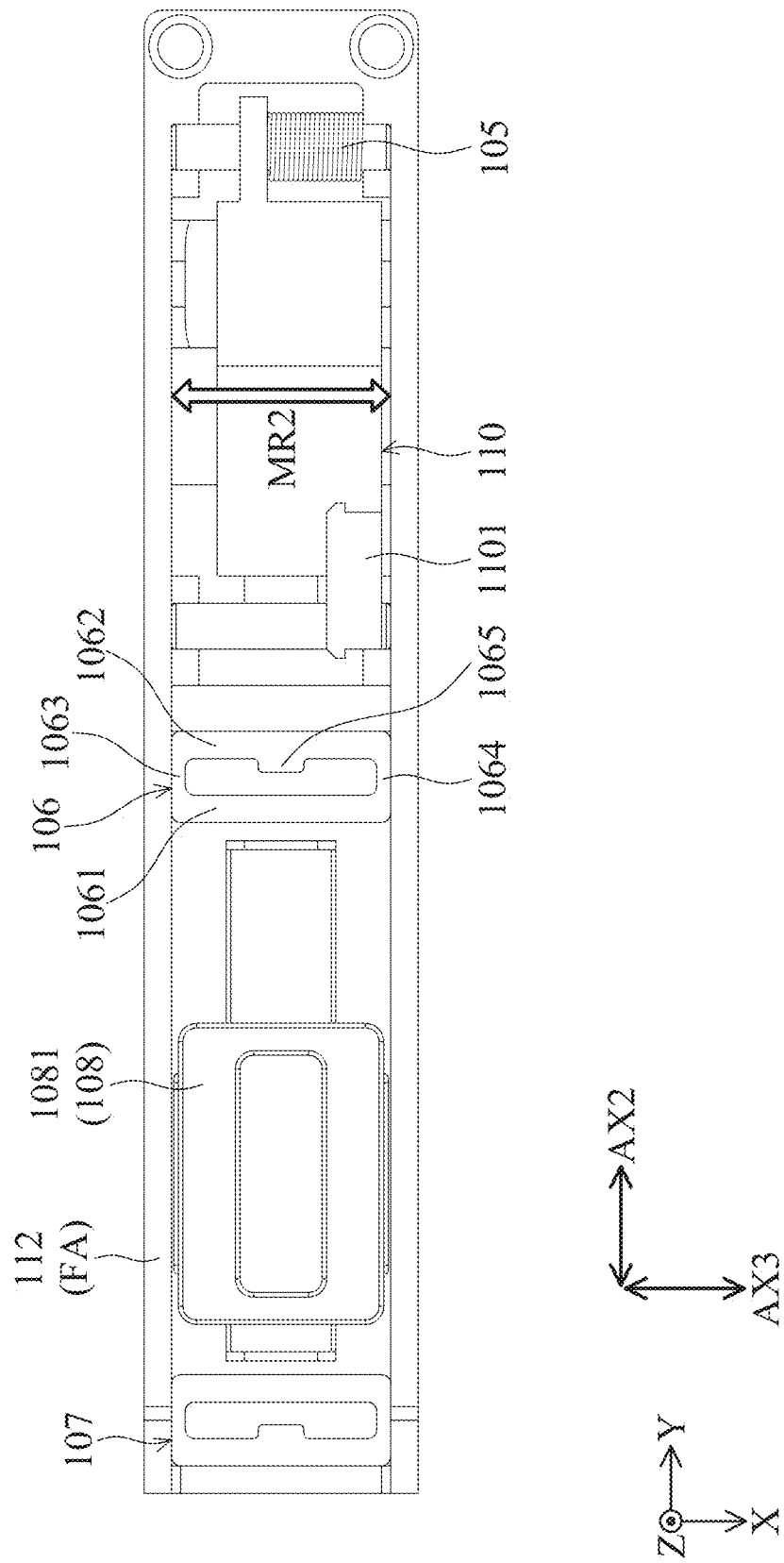
FIG. 7 is a top view of a partial structure of the optical element driving mechanism 100 according to an embodiment of the present disclosure.

Please refer to FIG. 7, which is a top view of a partial structure of the optical element driving mechanism 100 according to an embodiment of the present disclosure. The optical element driving mechanism 100 further includes a second elastic element 106 and a third elastic element 107, which are disposed between the first movable part 108 and the base 112 of the fixed assembly FA. The second elastic element 106 and the third elastic element 107 are configured to limit the motion range of the first movable part 108 relative to the second movable part 110.

The second elastic element 106 may include a first portion 1061, a second portion 1062, a first connecting portion 1063, a second connecting portion 1064 and a contact portion 1065. The first portion 1061 has a long strip-shaped structure, the second portion 1062 has a long strip-shaped structure, and the second portion 1062 is parallel to and separated from the first portion 1061.

The first portion 1061 is connected to the second portion 1062 via the first connecting portion 1063, the first portion 1061 is connected to the second portion 1062 via the second connecting portion 1064, and the contact portion 1065 is protruded from the second portion 1062. That is, the contact portion 1065 may be a part of the second portion 1062.

As shown in FIG. 7, the first portion 1061, the second portion 1062, the first connecting portion 1063 and the second connecting portion 1064 form a ring-shaped closed structure. In the second axis AX2, the maximum size of the first portion 1061 is smaller than the maximum size of the second portion 1062.

The second elastic element 106 and the first elastic element 105 have different materials. The second elastic element 106 has a non-metal material, and the first elastic element 105 has a metal material. For example, the second elastic element 106 is made of rubber or plastic, but it is not limited thereto. The third elastic element 107 and the second elastic element 106 are symmetrically arranged on the base 112, and the third elastic element 107 and the second elastic element 106 are the same elements, so the third elastic element 107 is not be repeated herein.

Please return to FIG. 3 and FIG. 4. In this embodiment, the first locking element 1083 has a first hook structure HK1, and the second locking element 1101 has a second hook structure HK2 corresponding to the first hook structure HK1. The second locking element 1101 may further include a third hook structure HK3 corresponding to a fourth hook structure HK4 of the first locking element 1083.

As shown in FIG. 3, when the first movable part 108 is located at the first position, the shortest distance between the first locking element 1083 and the second hook structure HK2 is less than the shortest distance between the first locking element 1083 and the third hook structure HK3. In addition, as shown in FIG. 4, when the first movable part 108 is located at the second position, the shortest distance between the first locking element 1083 and the second hook structure HK2 is greater than the shortest distance between the first locking element 1083 and the third hook structure HK3.

The first hook structure HK1 includes a first surface KS1 having a planar structure, which is parallel to the first axis AX1. The first surface KS1 is not parallel to the second axis AX2, and the first surface KS1 is not parallel to the third axis AX3. The second hook structure HK2 includes a second surface KS2 having a planar structure, which is parallel to the first axis AX1. The second surface KS2 is not parallel to the second axis AX2, and the second surface KS2 is not parallel to the third axis AX3.

The third hook structure HK3 includes a third surface KS3 having a planar structure, which is parallel to the first axis AX1. The third surface KS3 is not parallel to the second axis AX2, and the third surface KS3 is not parallel to the third axis AX3. The fourth hook structure HK4 includes a fourth surface KS4 having a planar structure, which is parallel to the first axis AX1. The fourth surface KS4 is not parallel to the second axis AX2, and the fourth surface KS4 is not parallel to the third axis AX3.

In this embodiment, the first locking element 1083 is fixedly disposed on the first movable part 108. For example, the first locking element 1083 and the optical element 1082 are integrally formed in one piece.

The second locking element 1101 is fixedly disposed on the second movable part 110. The second locking element 1101 and a second body 110B of the second movable part 110 are integrally formed in one piece, and the second locking element 1101 is protruded from the second body 110B along the first axis AX1 (FIG. 2).

Figure 8:
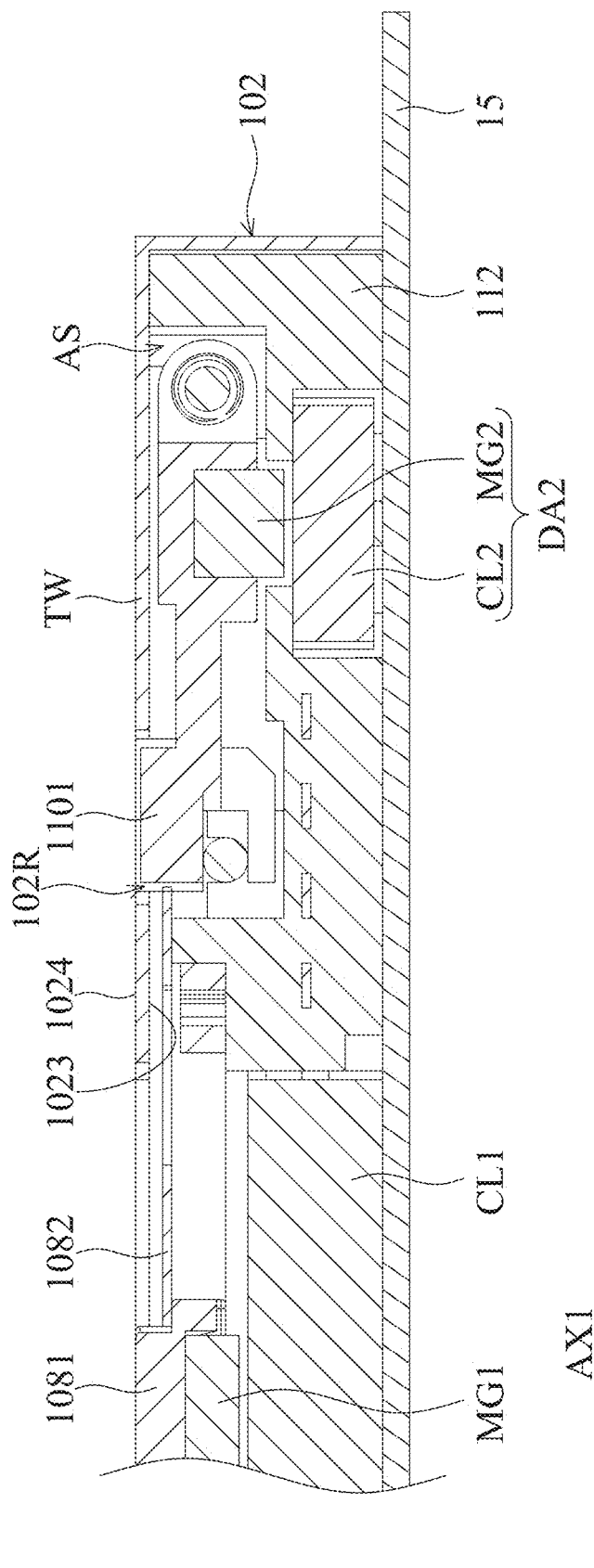
FIG. 8 is a cross-sectional view of the optical element driving mechanism 100 along the line A-A in FIG. 1 according to an embodiment of the present disclosure.

Please refer to FIG. 7 and FIG. 8. FIG. 8 is a cross-sectional view of the optical element driving mechanism 100 along the line A-A in FIG. 1 according to an embodiment of the present disclosure. As shown in FIG. 7, the second movable part 110 is movable relative to the fixed assembly FA in a second motion range MR2.

As shown in FIG. 8, the base 112 has an accommodation space AS configured to accommodate the second driving assembly DA2. Furthermore, the top wall TW of the outer frame 102 has a plate-shaped structure perpendicular to the first axis AX1. The top wall TW of the outer frame 102 has a receiving opening 102R configured to accommodate a part of the second locking element 1101.

Specifically, the top wall TW of the outer frame 102 has a first outer frame surface 1023 facing the optical element 1082. The top wall TW of the outer frame 102 has a second outer frame surface 1024, and the first outer frame surface 1023 and the second outer frame surface 1024 face opposite directions.

When the second movable part 110 is located at any position of the second motion range MR2, and when viewed along the second axis AX2 or the third axis AX3, the second locking element 1101 overlaps at least a part of the first outer frame surface 1023.

Furthermore, when the second movable part 110 is located at any position in the second motion range MR2, and when viewed along the second axis AX2 or the third axis AX3, the second locking element 1101 does not overlap the second outer frame surface 1024. That is, the second locking element 1101 is not protruded from the receiving opening 102R of the outer frame 102, so as to achieve the purpose of miniaturization.

Figure 9:
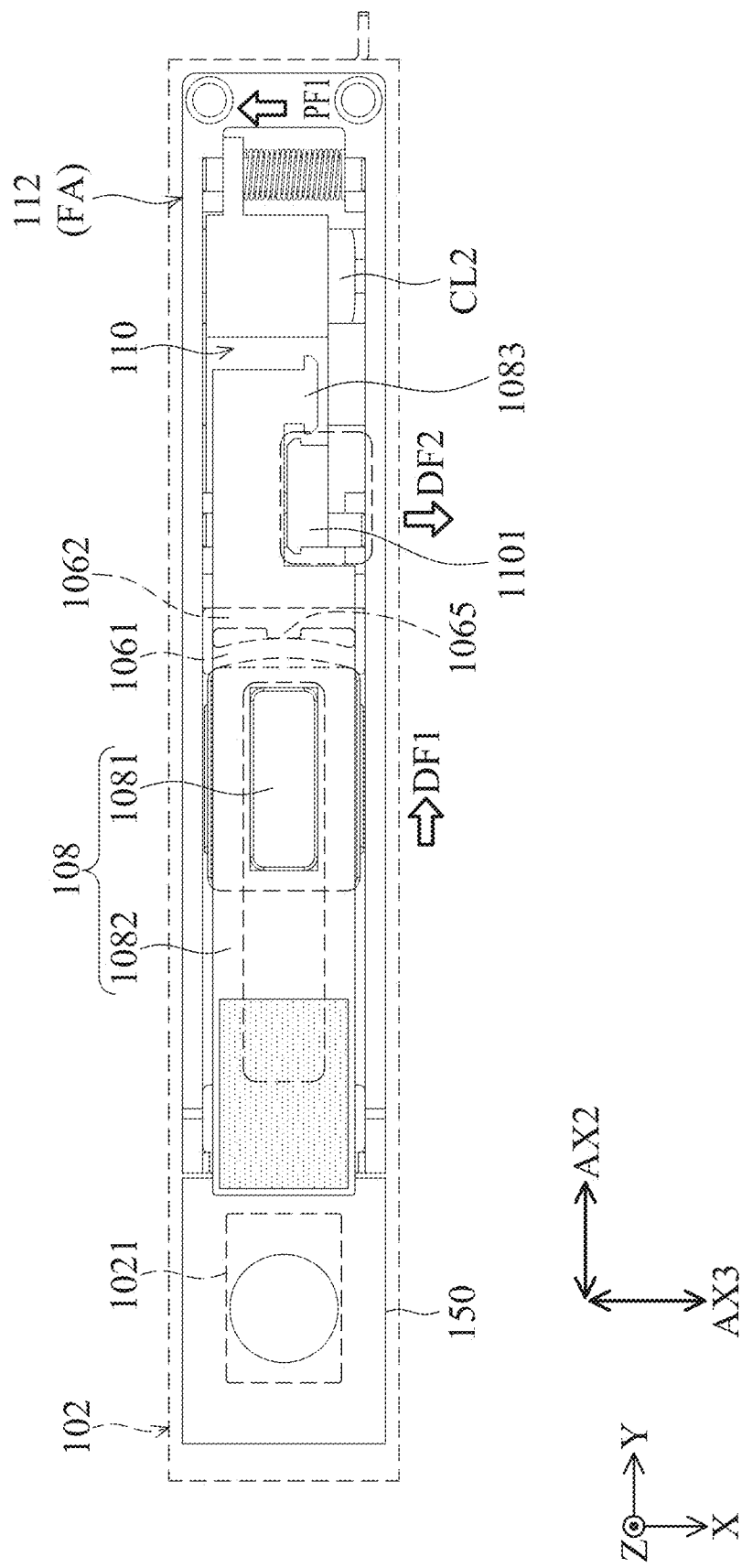
FIG. 9 is a top view illustrating that the first locking element 1083 is separated from the second locking element 1101 according to an embodiment of the present disclosure.
Figure 10:
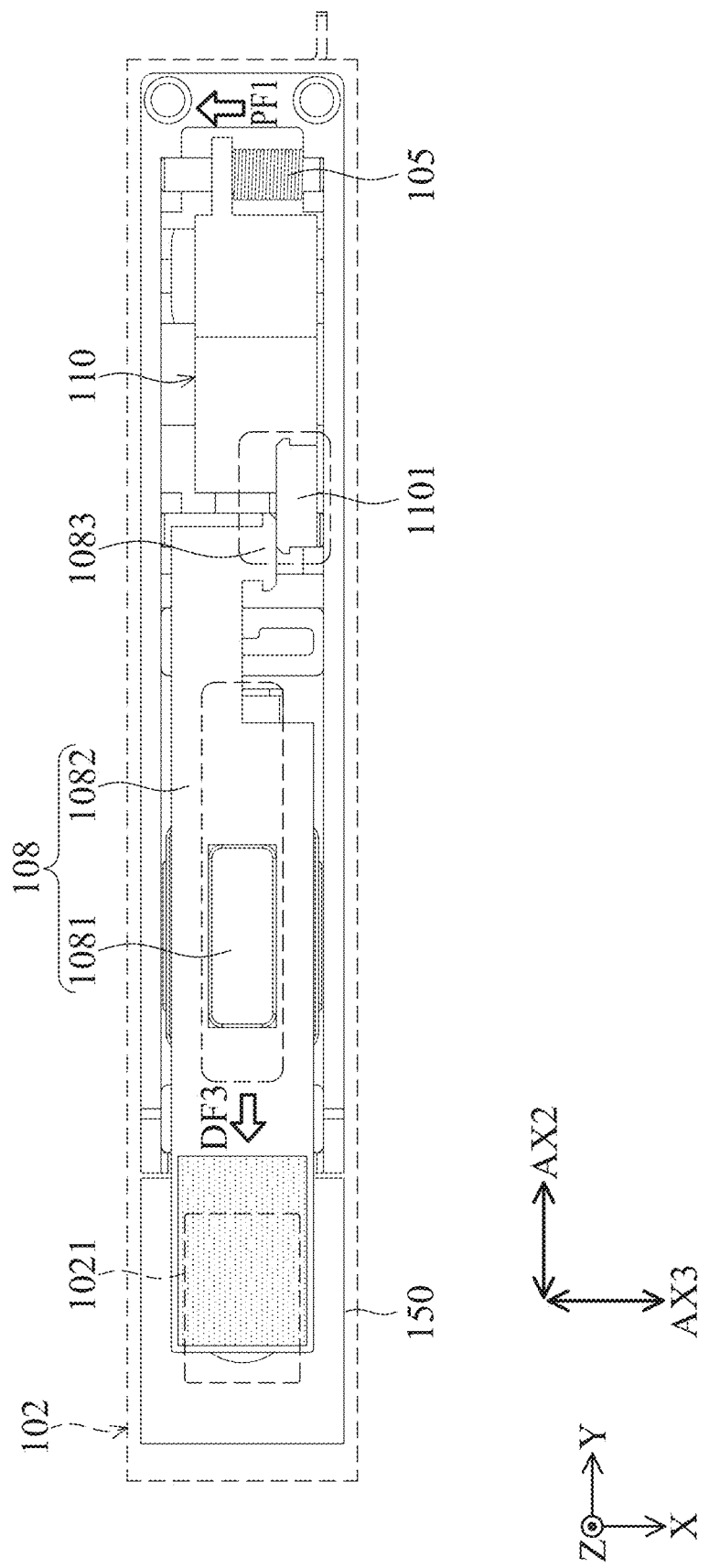
FIG. 10 is a top view illustrating that the first locking element 1083 is in contact with the second locking element 1101 and moves along the second axis AX2 according to an embodiment of the present disclosure.
Figure 11:
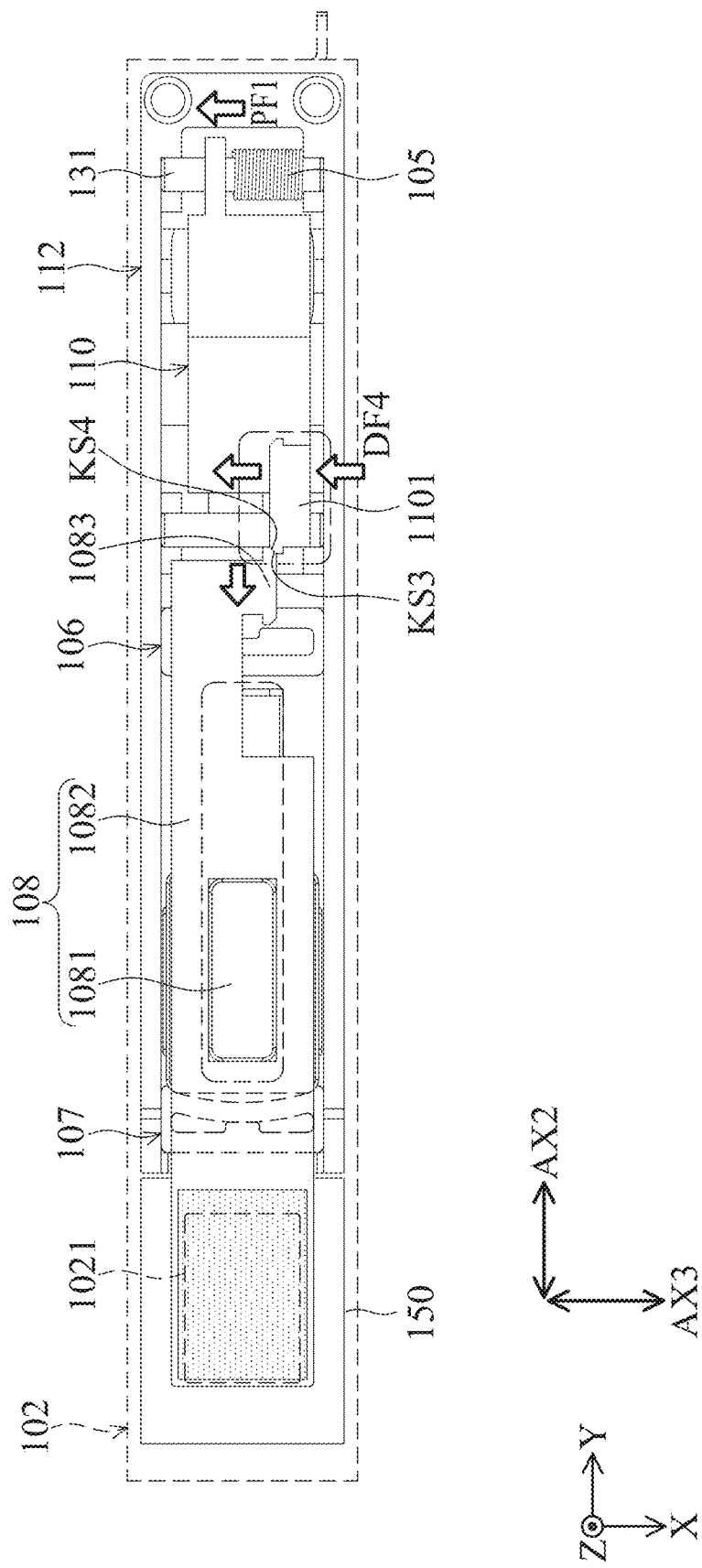
FIG. 11 is a top view illustrating that the fourth surface KS4 is in contact with the third surface KS3 according to an embodiment of the present disclosure.

Please refer to FIG. 3, FIG. 9, FIG. 10, FIG. 11, and FIG. 4. FIG. 9 is a top view illustrating that the first locking element 1083 is separated from the second locking element 1101 according to an embodiment of the present disclosure. FIG. 10 is a top view illustrating that the first locking element 1083 is in contact with the second locking element 1101 and moves along the second axis AX2 according to an embodiment of the present disclosure, and FIG. 11 is a top view illustrating that the fourth surface KS4 is in contact with the third surface KS3 according to an embodiment of the present disclosure.

The optical element driving mechanism 100 of the present disclosure can serve as a shutter to adjust the light amount entering the optical module 150. When the first opening 1021 needs to be closed to prevent the light from entering the optical module 150, the first coil CL1 is provided with electricity to generate a first driving force DF1 to drive the holder 1081 to move from the first position in FIG. 3 to a first extreme position in FIG. 9.

At this time, the holder 1081 pushes the second elastic element 106, and the shortest distance between the first portion 1061 and the first movable part 108 is less than the shortest distance between the second portion 1062 and the first movable part 108. When the first movable part 108 is located at the first extreme position relative to the fixed assembly FA, the first portion 1061 is in direct contact with the contact portion 1065 of the second portion 1062.

Furthermore, when the holder 1081 is located at the first extreme position, the first locking element 1083 is separated from the second locking element 1101. Then, the second coil CL2 is provided with electricity and acts with the second magnetic element MG2 to generate a second driving force DF2, so as to drive the second movable part 110 from the position in FIG. 9 to move downward along the third axis AX3 to the position in FIG. 10.

After that, the first coil CL1 is provided with electricity to generate a third driving force DF3 to drive the first movable part 108 to move along the second axis AX2 from the position in FIG. 9 to the position in FIG. 10. During the procedure of the movement, the first pre-pressure PF1 is applied to the second movable part 110, so that the second locking element 1101 is in contact with the first locking element 1083.

Next, the third driving force DF3 continues to drive the first movable part 108 to move along the second axis AX2 to the position in FIG. 11. At this time, the second coil CL2 is provided with electricity to generate a fourth driving force DF4, and the fourth driving force DF4 and first pre-pressure PF1 drive the second movable part 110 to move upward, so that the third surface KS3 is in contact with the fourth surface KS4. Then, the second locking element 1101 moves upward along the fourth surface KS4, and the holder 1081 pushes the third elastic element 107.

Finally, the second movable part 110 moves to the second position in FIG. 4, and the elastic force of the third elastic element 107 pushes the first movable part 108 rightward, so that the first movable part 108 moves from the position in FIG. 11 to the second position in FIG. 4. Then, the third hook structure HK3 is stably engaged with the fourth hook structure HK4. Therefore, the second locking element 1101 locks the first locking element 1083 again to achieve the purpose of closing the first opening 1021. The steps of opening the first opening 1021 are similar to the steps of closing the first opening 1021, so it not be repeated herein.

It is worth noting that, in this embodiment, when the first movable part 108 does not contact the second elastic element 106 and does not move to the first extreme position, the first locking element 1083 cannot be separated from the second locking element 1101. Based on this design, it can be further ensured that the second locking element 1101 is firmly engaged with the first locking element 1083, so as to avoid the problem that the optical element 1082 is separated from the second locking element 1101 when the optical element driving mechanism 100 is impacted.

Figure 12:
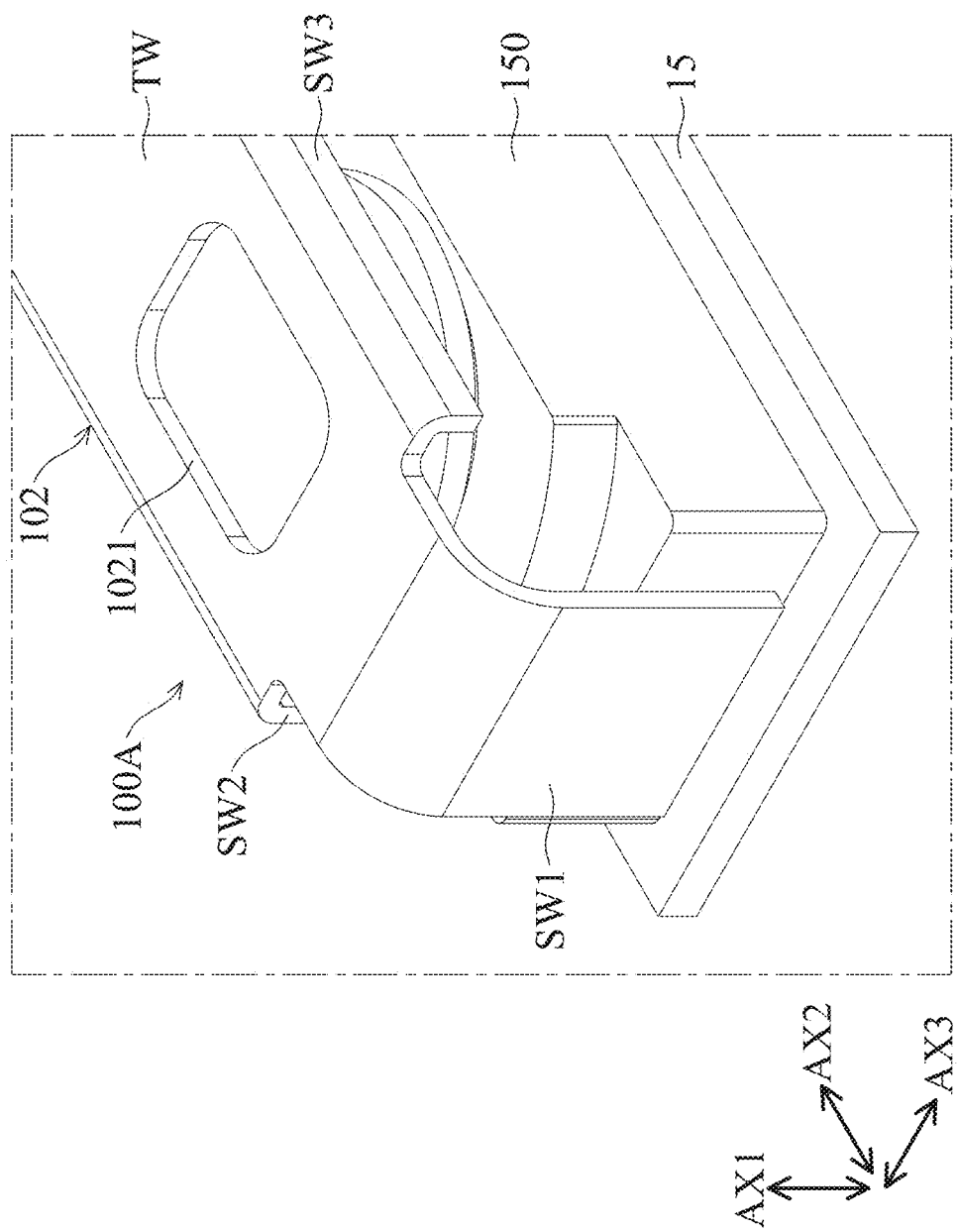
FIG. 12 is a perspective diagram of an optical element driving mechanism 100A according to another embodiment of the present disclosure.
Figure 13:
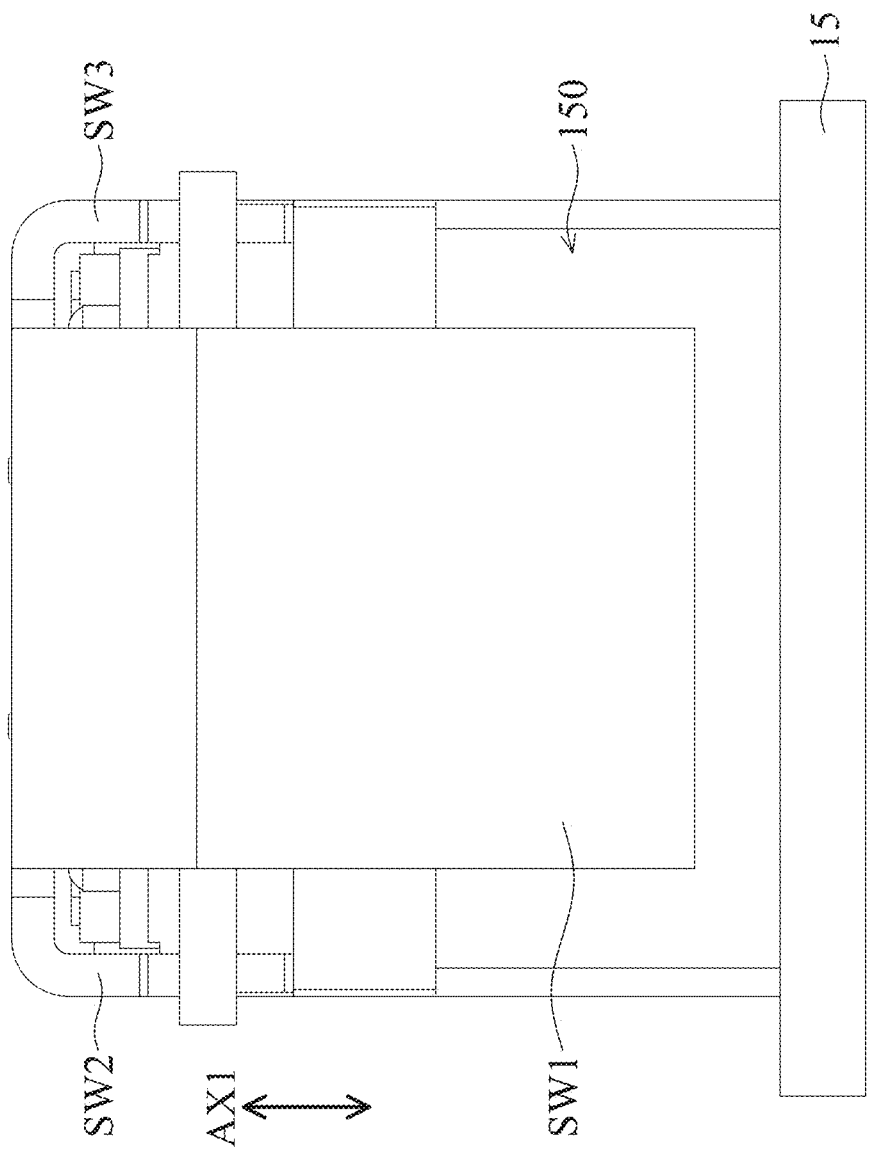
FIG. 13 is a front view of the optical element driving mechanism 100A according to another embodiment of the present disclosure.
Figure 14:
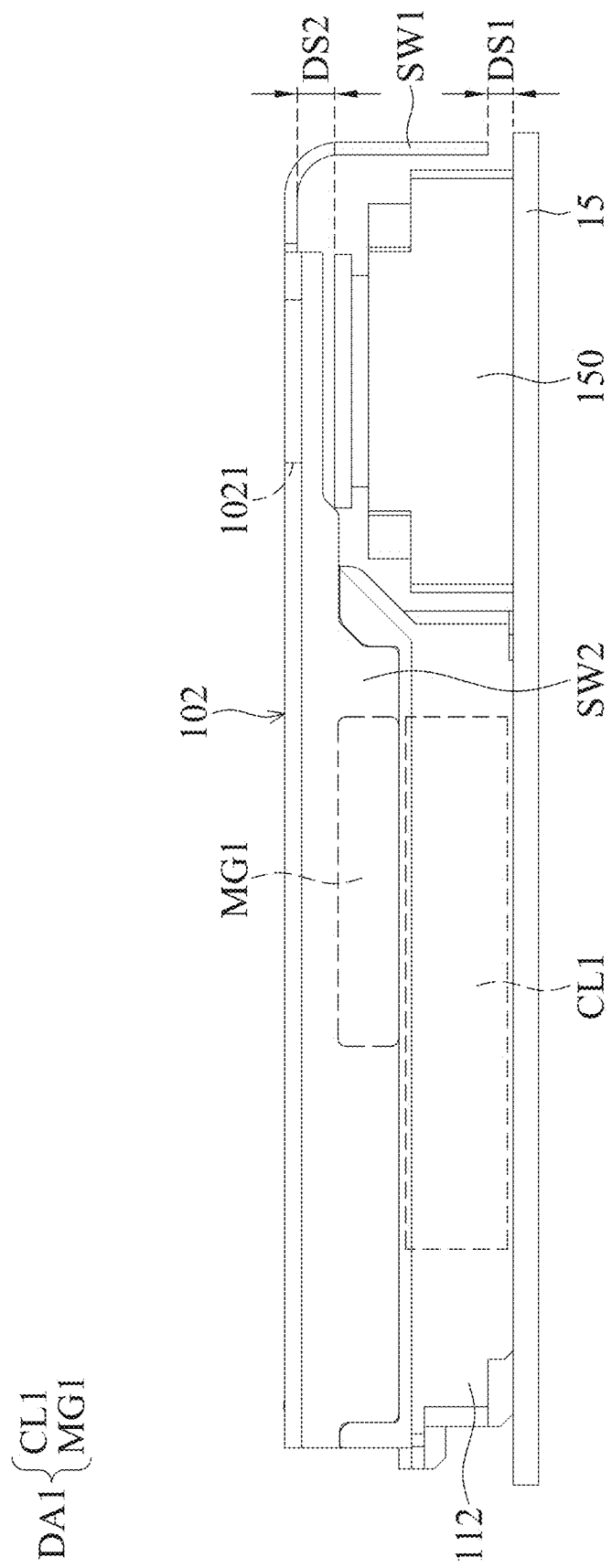
FIG. 14 is a side view of the optical element driving mechanism 100A according to another embodiment of the present disclosure.

Please refer to FIG. 12 to FIG. 14. FIG. 12 is a perspective diagram of an optical element driving mechanism 100A according to another embodiment of the present disclosure, FIG. 13 is a front view of the optical element driving mechanism 100A according to another embodiment of the present disclosure, and FIG. 14 is a side view of the optical element driving mechanism 100A according to another embodiment of the present disclosure.

The optical element driving mechanism 100A and the optical element driving mechanism 100 of this embodiment have similar components. Similarly, the outer frame 102 has a top wall TW, a first side wall SW1, a second side wall SW2 and a third side wall SW3. The first side wall SW1, the second side wall SW2 and the third side wall SW3 are extended along the first axis AX1 from the top wall TW.

When viewed along the first axis AX1, the first side wall SW1 and the first driving assembly DA1 are located on two sides of the first opening 1021. Similarly, the optical element driving mechanism 100A and the optical module 150 are disposed on the base plate 15, the optical module 150 is electrically connected to the base plate 15, and the optical element driving mechanism 100A is electrically connected to the base plate 15.

The difference is that when the outer frame 102 is combined with the base 112, the first side wall SW1 having the plate-shaped structure is not parallel to the second side wall SW2 having the plate-shaped structure, and the second side wall SW2 having the plate-shaped structure is not parallel to the third side wall SW3 having the plate-shaped structure.

Furthermore, there is a gap between the first side wall SW1 and the base plate 15, there is a gap between the second side wall SW2 and the base plate 15, and there is a gap between the third side wall SW3 and the base plate 15. The shortest distance between the first side wall SW1 and the base plate 15 is less than the shortest distance between the second side wall SW2 and the base plate 15, and the shortest distance between the second side wall SW2 and the base plate 15 is equal to the shortest distance between the third side wall SW3 and the base plate 15.

It is worth noting that the shortest distance DS1 between the first side wall SW1 and the base plate 15 is less than the shortest distance DS2 between the outer frame 102 and the optical module 150. Based on this structural design, it can be ensured that when the outer frame 102 is bent by a force along the Z-axis, the first side wall SW1 can be bent first to resist the base plate 15, so that the optical module 150 is not touched and damaged by the outer frame 102.

The present disclosure provides an optical element driving mechanism, including a first movable part, a fixed assembly, a first driving assembly, a second movable part, a second driving assembly and a locking assembly. The first movable part is movable relative to the fixed assembly. The first driving assembly is configured to drive the first movable part to move relative to the fixed assembly. The second driving assembly is configured to drive the second movable part to move relative to the first movable part and the fixed assembly. The locking assembly is configured to fix the first movable part at the first position or the second position relative to the fixed assembly.

The locking assembly LA includes a first locking element 1083 and a second locking element 1101, which are configured to engage with each other, thereby locking the optical element 1082. In some embodiments, the first hook structure HK1 of the first locking element 1083 is configured to engage with the second hook structure HK2 of the second locking element 1101, and the fourth hook structure HK4 of the first locking element 1083 is configured to engage with the third hook structure HK3 of the second locking element 1101. Based on the design of these hook structures, the optical element 1082 can be firmly locked. When the optical element driving mechanism is impacted, it can effectively prevent the second locking element 1101 from separating from the first locking element 1083 on the optical element 1082.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:
1. An optical element driving mechanism, comprising:
a first movable part, configured to connect an optical element;
a fixed assembly, wherein the first movable part is movable relative to the fixed assembly;
a first driving assembly, configured to drive the first movable part to move relative to the fixed assembly;
a second movable part;
a second driving assembly, configured to drive the second movable part to move relative to the first movable part and the fixed assembly; and
a locking assembly, configured to fix the first movable part at a first position relative to the fixed assembly;
wherein the optical element driving mechanism further includes a first opening configured to allow an external light traveling along a first axis to pass through;

when viewed along the first axis, the first driving assembly is located between the second driving assembly and the first opening;
the first driving assembly is configured to drive the first movable part to move along a second axis relative to the fixed assembly;
the second driving assembly is configured to drive the second movable part to move along a third axis;
the third axis is perpendicular to the first axis and the second axis.

2. The optical element driving mechanism as claimed in claim 1, wherein
when viewed along the first axis, the optical element driving mechanism has a long strip-shaped structure extending along the second axis, and the first opening, the first driving assembly and the second driving assembly are arranged along the second axis;
the first axis is not parallel to the second axis;
the second axis is perpendicular to the first axis;
when viewed along the first axis, and when the first movable part is located at the first position, the optical element does not overlap at least a part of the first opening;
when viewed along the first axis, and when the first movable part is located at a second position, the optical element overlaps at least a part of the first opening;
when viewed along the second axis, the first driving assembly overlaps at least a part of the second driving assembly.

3. The optical element driving mechanism as claimed in claim 2, wherein the first driving assembly includes:
a first coil;
a first magnetic element, corresponding to the first coil; and
a first magnetically conductive element, having a magnetically conductive material and having a long strip-shaped structure;
wherein a first winding axis of the first coil is parallel to an extending direction of the first magnetically conductive element.

4. The optical element driving mechanism as claimed in claim 3, wherein the second driving assembly includes:
a second coil;
a second magnetic element, corresponding to the second coil; and
a second magnetically conductive element, having a magnetically conductive material and having a long strip-shaped structure;
a second winding axis of the second coil is not parallel to an extending direction of the second magnetically conductive element.

5. The optical element driving mechanism as claimed in claim 4, wherein in the second axis, a maximum size of the second magnetically conductive element is smaller than a maximum size of the second magnetic element;
in the second axis, the maximum size of the second magnetically conductive element is smaller than a maximum size of the second coil;
the first winding axis is not parallel to the second winding axis;
an arrangement direction of the first coil and the first magnetic element is parallel to an arrangement direction of the second coil and the second magnetic element;
the extending direction of the first magnetically conductive element is not parallel to the extending direction of the second magnetically conductive element.

6. The optical element driving mechanism as claimed in claim 5, wherein the optical element driving mechanism further includes a guiding assembly configured to guide the second movable part to move along the third axis, and the guiding assembly includes:
a first guiding element having a long strip-shaped structure and extending along the third axis;
a second guiding element, having a long strip-shaped structure and extending along the third axis;
a first guiding structure, fixedly disposed on the second movable part and configured to correspond to the first guiding element; and
a second guiding structure, fixedly disposed on the second movable part and configured to correspond to the second guiding element.

7. The optical element driving mechanism as claimed in claim 6, wherein when viewed along the second axis, the second magnetic element overlaps at least a part of the first guiding element;
when viewed along the second axis, the second magnetic element overlaps at least a part of the second guiding element;
when viewed along the second axis, the second coil does not overlap the first guiding element;
when viewed along the second axis, the second coil does not overlap the second guiding element.

8. The optical element driving mechanism as claimed in claim 7, wherein the first guiding structure has a closed perforated structure;
when viewed along the third axis, the second guiding structure has a recessed structure, and the recessed structure extends along the second axis;
the guiding assembly further includes a first elastic element configured to apply a first pre-pressure to the second movable part;
a direction of the first pre-pressure is parallel to the third axis;
the first elastic element is disposed on the first guiding element.

9. The optical element driving mechanism as claimed in claim 8, wherein the optical element driving mechanism further includes a second elastic element disposed between the first movable part and the fixed assembly;
the second elastic element includes:
a first portion, having a long strip-shaped structure;
a second portion, having a long strip-shaped structure, wherein the second portion is parallel to and separated from the first portion;
a first connecting portion, wherein the first portion is connected to the second portion via the first connecting portion;
a second connecting portion, wherein the first portion is connected to the second portion via the second connecting portion; and
a contact portion, protruded from the second portion.

10. The optical element driving mechanism as claimed in claim 9, wherein the first portion, the second portion, the first connecting portion and the second connecting portion form a ring-shaped closed structure;
in the second axis, a maximum size of the first portion is smaller than a maximum size of the second portion;
the second elastic element is configured to limit a motion range of the first movable part relative to the second movable part.

11. The optical element driving mechanism as claimed in claim 10, wherein the second elastic element and the first elastic element have different materials;

the second elastic element has a non-metallic material;
the first elastic element has a metal material;
a shortest distance between the first portion and the first movable part is less than a shortest distance between the second portion and the first movable part;
when the first movable part is located at a first extreme position relative to the fixed assembly, the first portion is in direct contact with the second portion.

12. The optical element driving mechanism as claimed in claim 11, wherein the locking assembly includes:
a first locking element, having a first hook structure; and
a second locking element, having a second hook structure corresponding to the first hook structure;
wherein the second locking element further includes a third hook structure, corresponding to a fourth hook structure of the first locking element;
when the first movable part is located at the first position, a shortest distance between the first locking element and the second hook structure is less than a shortest distance between the first locking element and the third hook structure;
when the first movable part is located at the second position, the shortest distance between the first locking element and the second hook structure is greater than the shortest distance between the first locking element and the third hook structure.

13. The optical element driving mechanism as claimed in claim 12, wherein the first hook structure includes a first surface having a planar structure, which is parallel to the first axis;
the first surface is not parallel to the second axis;
the first surface is not parallel to the third axis;
the second hook structure includes a second surface having a planar structure, which is parallel to the first axis;
the second surface is not parallel to the second axis;
the second surface is not parallel to the third axis;
the third hook structure includes a third surface having a planar structure, which is parallel to the first axis;
the third surface is not parallel to the second axis;
the third surface is not parallel to the third axis;
the fourth hook structure includes a fourth surface having a planar structure, which is parallel to the first axis;
the fourth surface is not parallel to the second axis;
the fourth surface is not parallel to the third axis;
the first locking element is fixedly disposed on the first movable part;
the first locking element and the optical element are integrally formed in one piece;
the second locking element is fixedly disposed on the second movable part;
the second locking element and a second body of the second movable part are integrally formed in one piece;
the second locking element is protruded from the second body along the first axis.

14. The optical element driving mechanism as claimed in claim 13, wherein the second movable part is movable relative to the fixed assembly in a second motion range;
the fixed assembly includes an outer frame and a base;
the base is configured to accommodate the second driving assembly;
the outer frame has a plate-shaped structure and is perpendicular to the first axis;
the outer frame has a receiving opening configured to accommodate a part of the second locking element;
the outer frame has a first outer frame surface facing the optical element;
the outer frame has a second outer frame surface, wherein the first outer frame surface and the second outer frame surface face opposite directions;
when the second movable part is located at any position of the second motion range, and when viewed along the second axis or the third axis, the second locking element overlaps at least a part of the first outer frame surface;
when the second movable part is located at any position of the second motion range, and when viewed along the second axis or the third axis, the second locking element does not overlap the second outer frame surface.

15. The optical element driving mechanism as claimed in claim 14, wherein when the first movable part does not contact the second elastic element, the first locking element is not able to be separated from the second locking element.

16. The optical element driving mechanism as claimed in claim 14, wherein the outer frame further includes:
a first side wall, extending along the first axis;
a second side wall, extending along the first axis; and
a third side wall, extending along the first axis;
wherein the first side wall having a plate-shaped structure is parallel to the second side wall having a plate-shaped structure;
the second side wall having the plate structure is parallel to the third side wall having a plate structure.

17. The optical element driving mechanism as claimed in claim 16, wherein the optical element driving mechanism and an optical module are disposed on a base plate;
the optical module includes a lens;
the optical module is electrically connected to the base plate;
the optical element driving mechanism is electrically connected to the base plate;
the first side wall is in direct contact with the base plate;
the second side wall is in direct contact with the base plate;
the third side wall is in direct contact with the base plate;
when viewed along the first axis, the first side wall and the first driving assembly are located on two sides of the first opening.

18. The optical element driving mechanism as claimed in claim 14, wherein the outer frame further includes:
a first side wall, extending along the first axis;
a second side wall, extending along the first axis; and
a third side wall, extending along the first axis;
wherein when the outer frame is combined with the base, the first side wall having a plate-shaped structure is not parallel to the second side wall having a plate-shaped structure;
when the outer frame is combined with the base, the second side wall having the plate-shaped structure is not parallel to the third side wall having the plate-shaped structure.

19. The optical element driving mechanism as claimed in claim 18, wherein the optical element driving mechanism and an optical module are disposed on a base plate;
the optical module includes a lens;
the optical module is electrically connected to the base plate;
the optical element driving mechanism is electrically connected to the base plate;
there is a gap between the first side wall and the base plate;
there is a gap between the second side wall and the base plate;

there is a gap between the third side wall and the base plate.

20. The optical element driving mechanism as claimed in claim 19, wherein a shortest distance between the first side wall and the base plate is less than a shortest distance between the second side wall and the base plate;
- the shortest distance between the second side wall and the base plate is equal to a shortest distance between the third side wall and the base plate;
- the shortest distance between the first side wall and the base plate is less than a shortest distance between the outer frame and the optical module;
- when viewed along the first axis, the first side wall and the first driving assembly are located on two sides of the first opening.

* * * * *